US007522538B2

(12) United States Patent
Rhim et al.

(10) Patent No.: US 7,522,538 B2
(45) Date of Patent: Apr. 21, 2009

(54) SYSTEM-ON-CHIP ESTABLISHING PATHS BETWEEN ROUTERS AND METHOD THEREFOR

(75) Inventors: Sang-woo Rhim, Seoul (KR);
Beom-hak Lee, Seoul (KR); Jae-kon Lee, Suwon-si (KR); Eui-seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 756 days.

(21) Appl. No.: 10/998,957

(22) Filed: Nov. 30, 2004

(65) Prior Publication Data

US 2005/0163117 A1  Jul. 28, 2005

(30) Foreign Application Priority Data

Jan. 28, 2004  (KR) .................. 10-2004-0005328

(51) Int. Cl.
*H04L 12/28* (2006.01)
*H04L 12/56* (2006.01)

(52) U.S. Cl. ...................... 370/254; 370/392
(58) Field of Classification Search ............... 370/238, 370/252, 254, 335, 351, 355, 356, 389, 392, 370/395.31, 400, 401
See application file for complete search history.

(56) References Cited

U.S. PATENT DOCUMENTS

| | | | |
|---|---|---|---|
| 6,108,708 A * | 8/2000 | Iwata | 709/238 |
| 6,606,656 B2 * | 8/2003 | Carvey et al. | 709/220 |
| 6,791,949 B1 * | 9/2004 | Ryu et al. | 370/254 |
| 6,801,496 B1 * | 10/2004 | Saleh et al. | 370/221 |
| 2004/0133689 A1 * | 7/2004 | Vasisht | 709/228 |
| 2005/0078601 A1 * | 4/2005 | Moll et al. | 370/218 |

OTHER PUBLICATIONS

Sathe et al., "Design of a Switching Node (Router) for On-Chip Networks", ASIC, 2003, Proceedings, 5th International Conference on Oct. 21-24, 2003, Piscataway, NJ, IEEE, vol. 1, Oct. 21, 2003, pp. 75-78.

Bartic et al., "Highly Scalable Network on Chip for Reconfigurable Systems", System-on-Chip, 2003, Proceedings, International Symposium on Nov. 19-21, 2003, Piscataway, NJ, IEEE, Nov. 19, 2003, pp. 79-82.

Saastamoinen et al., "Interconnect IP Node for Future System-on-Chip Designs", Proceedings of the IEEE International Workshop on Electronic Design, Test and Applications, Jan. 2002, pp. 1-5.

Rijpkema et al., "A Router Architecture for Networks on Silicon", Progress, Workshop on Embedded Systems, Nov. 2001, pp. 181-188.

(Continued)

*Primary Examiner*—Hong Cho
(74) *Attorney, Agent, or Firm*—Staas & Halsey LLP (57) ABSTRACT

A method of establishing a path between routers in a system-on-chip (SoC) of n×n mesh topology structure having a plurality of intellectual properties (IPs) each with a unique address and routers corresponding to each of the IPs respectively, including: receiving a routing packet including a hop counter, and updating address information and information of a stored routing table; establishing a path to at least one neighboring router using the updated routing table upon a request to establish the path; and delivering data by using the established path.

29 Claims, 7 Drawing Sheets

OTHER PUBLICATIONS

Kumar et al., "A Network on Chip Architecture and Design Methodology", VLSI on Annual Symposium, IEEE Computer Society ISVLSI 2002, Pittsburgh, PA, Apr. 2002, Los Alamitos, CA, IEEE Comput. Soc., US, Apr. 25, 2002, pp. 117-124.

Millberg et al., "The Nostrum Backbone—a Communication Protocol Stack for Networks on Chip", Proceedings, International Conference on VLSI Design on Jan. 5-9, 2004, Los Alamitos, CA, pp. 693-696.

* cited by examiner

SYSTEM-ON-CHIP ESTABLISHING PATHS BETWEEN ROUTERS AND METHOD THEREFOR

CROSS-REFERENCE TO RELATED APPLICATION

This application claims benefit under 35 U.S.C. § 119 from Korean Patent Application No. 2004-5328 filed on Jan. 28, 2004, the disclosure of which is incorporated herein by reference.

BACKGROUND OF THE INVENTION

1. Field of the Invention

The present invention relates to a system-on-chip having an n×n mesh topology structure. More particularly, the present invention relates to establishing paths between routers of a system-on-chip.

2. Description of Related Art

To facilitate Internet access or computing functions of digital data equipment like cell phones, PDAs (Personal Digital Assistants), digital TVs, and smart phones, a number of semiconductor chips including microprocessor, network chip, and memory are required. As the data equipment has become more complicated, integration among these products is already occurring and will become a necessity in near future. If that happens, even more chips will be required within one single data device.

Developed as an answer to the above is a System-on-a-Chip (SoC) technology which integrates features of every component (even semiconductors) on a single chip. In general, the SoC system is constructed of a computing element, input and output (I/O), logic, and memory. The compact and high-integration SoC features high performance and low power consumption, so a majority of data equipment will benefit from the SoC technology. Intellectual property (IP) is also used to help designers to create the semiconductor chip much more rapidly. The IP is a design block that is specially developed as a ready-to-use application to the single chip.

A number of technologies have been devised to realize the SoC, and approaches connecting various IPs embedded in a chip have been addressed as a critical factor. There are two approaches connecting the various IPs, one using a bus structure and the other using a network structure. However, the bus architecture already reached its structural limit as the amount of data transmitted/received between IPs increases. This is because when a specific IP uses a bus, and other IPs cannot use the bus at all. That is, the specific IP exclusively uses the bus.

Moreover, the bus architecture is not extendable but fixed, so that additional IPs of the chip cannot be connected to a bus. As an attempt to solve the performance drawback of the bus architecture, network architecture has been devised to connect IPs. Furthermore, the network structure has an advantage of low power consumption compared to the bus structure. Hereinafter, the network structure is referred to as networks-on-chip (NoC). The NoC architecture causes a problem when general network technologies are applied since networks are designed on the IPs embedded in a chip.

According to another aspect of the present invention, there is provided a method of establishing a path between routers in a system-on-chip of n×n mesh topology structure, including: originating, via a router, a routing packet; setting a hop counter of the routing packet to 1; broadcasting the routing packet from the router to at least one neighboring router; generating a token packet having a destination address indicating an address of an IP connected to first router; and broadcasting the token packet to the at least one neighboring router.

According to another aspect of the present invention, there is provided a method of establishing a path between routers in a system-on-chip of n×n mesh topology structure, including: comparing, when a routing packet is received from a neighboring router, a hop counter of the routing packet to 2(n−1), reading a source address from the received routing packet when the hop counter of the received routing packet is determined to be less than 2(n−1), and discarding the received routing packet when the hop counter of the received routing packet is determined not to be less than 2(n−1), 2(n−1) being a smallest hop number to a router positioned at n×n from a router positioned at 1×1 and of the n×n mesh topology; determining whether the read address is a new address, updating a routing table using the received routing packet when the read address is a new address, and comparing the hop counter of the received routing packet to a stored hop counter for the source address stored in the routing table when the read address is not a new address; updating the routing table when the hop counter of the received routing packet is determined in the comparing the hop counter of the received routing packet to a stored hop counter to be less than or equal to the hop counter stored in the routing table; updating the hop counter of the received routing packet when the hop counter of the received routing packet is determined in the comparing the hop counter of the received routing packet to a stored hop counter to be larger than the hop counter stored in the routing table; and determining whether a destination address of a received token packet is the same as that of the router; sending the routing packet data to an IP connected thereto when the destination address is determined to be the same, and broadcasting the updated received router packet to at least another neighboring router when the destination address is determined not to be the same.

According to another aspect of the present invention, there is provided a method of establishing a path between routers in a system-on-chip of n×n mesh topology structure, including: reading a destination address of a received token packet received by a receiving router from a neighboring router; comparing the read destination address to the address of the receiving router; generating a routing packet including information about the receiving router when the addresses are determined to be the same, and discarding the received token packet when the addresses are determined not to be the same; broadcasting the generated routing packet to at least one neighboring router; designating a router to generate a next routing packet; generating a token packet having a destination address of the designated router; and broadcasting the generated token packet to the at least one neighboring router.

According to another aspect of the present invention, there is provided a method of establishing multiple paths for data transmission, including: receiving data and a destination address of the data from a neighboring router; determining whether x-direction position information of the received destination address is the same as x-direction position information of a receiving router; sending the received data to a router based on the determining of x-direction information; determining whether the y-direction position information of the received destination address is the same as y-direction position information of the receiving router; and sending the received data a router based on the determining of y-direction information.

BRIEF SUMMARY

The present invention has been developed in order to solve the above and/or other drawbacks and other problems associated with the conventional arrangement. An object of the present invention is to provide a system-on-chip establishing paths between routers constituted therein in a n×n mesh topology structure and a method therefor.

Another object of the present invention is to provide a system-on-chip establishing a shortest path between routers by using a stored routing table and a method therefor.

Yet another object of the present invention is to provide a system-on-chip for searching for an available path when an intended path has been occupied and a method therefor.

According to an aspect of the present invention, there is provided a method of establishing a path between routers in a system-on-chip (SoC) of n×n mesh topology structure having a plurality of intellectual properties (IPs) each with a unique address and routers corresponding to each of the IPs respectively, including: receiving a routing packet including a hop counter, and updating address information and information of a stored routing table; establishing a path to at least one neighboring router using the updated routing table upon a request to establish the path; and delivering data by using the established path.

According to another aspect of the present invention, there is provided a system-on-chip (SoC) having a n×n mesh topology structure having a plurality of intellectual properties (IPs) each with a unique address and routers corresponding respectively to the plurality of IPs, and for establishing a path between routers, including: the routers receiving routing packets each including a hop counter and address information, updating information constituting a stored routing table by use of the received routing packets, and establishing a path to one of neighboring routers by use of the updated routing table upon requested to establish the path; and the IPs receiving and delivering data by using the established path.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 1:
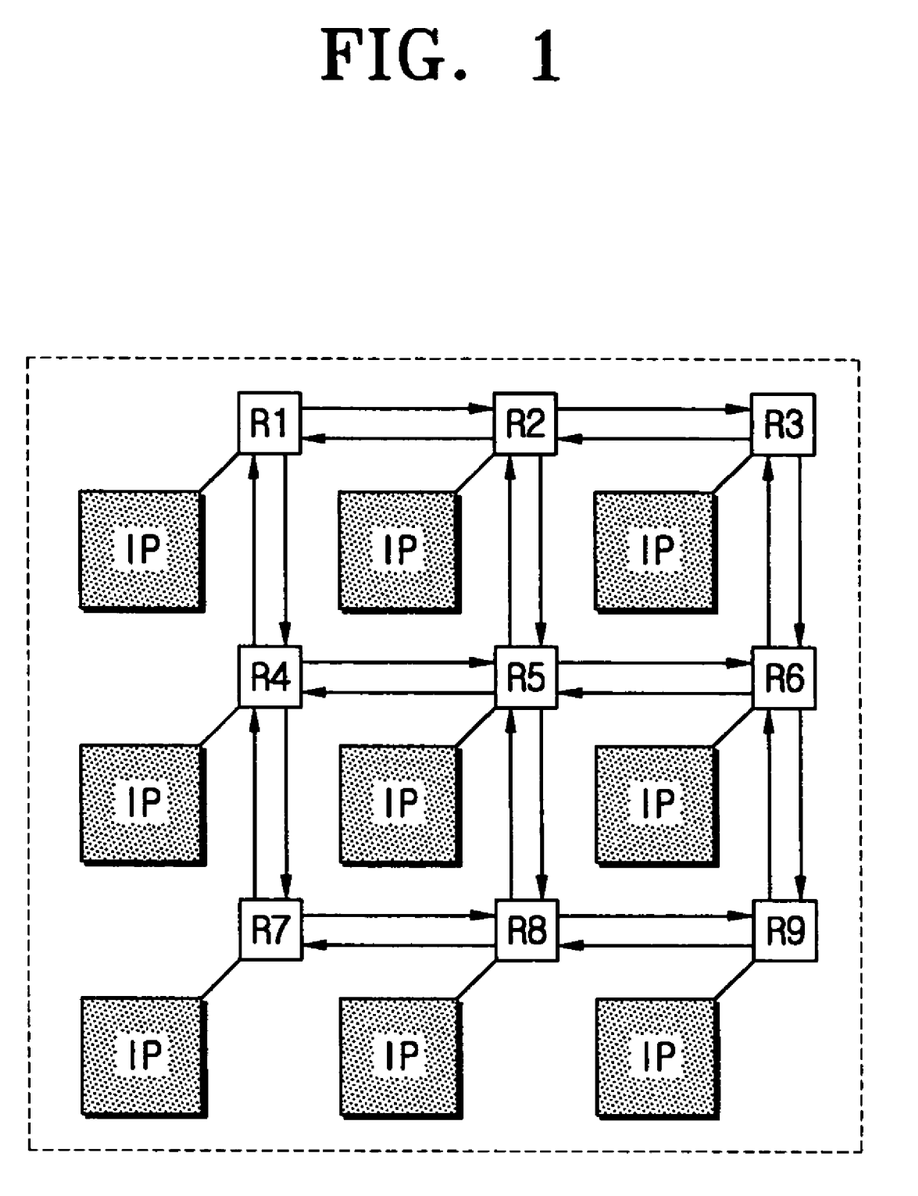
FIG. 1 is a view illustrating a system-on-chip having an n×n mesh topology structure according to an embodiment of the present invention.

FIG. 1 is a view illustrating a structure of a chip network of an n×n mesh topology according to an embodiment of the present invention. FIG. 1 shows an exemplary chip network when n is 3. As shown in FIG. 1, the SoC includes a plurality of IPs and routers R (R(N)) corresponding to the respective IPs. The IPs are matched one to one with the routers. The routers are interconnected with the routers of neighboring IPs respectively, and receive data from the neighboring IPs. If the destination address of received data is the same as that of the receiving router, the router sends the received data to an IP connected thereto. If the destination address of the received data is not the same as that of the receiving router, the router sends the received data to the neighboring router. Hereinafter, description will be made on a process for routers embedded in the SoC to establish an initial path for data transmission.

Figure 2:
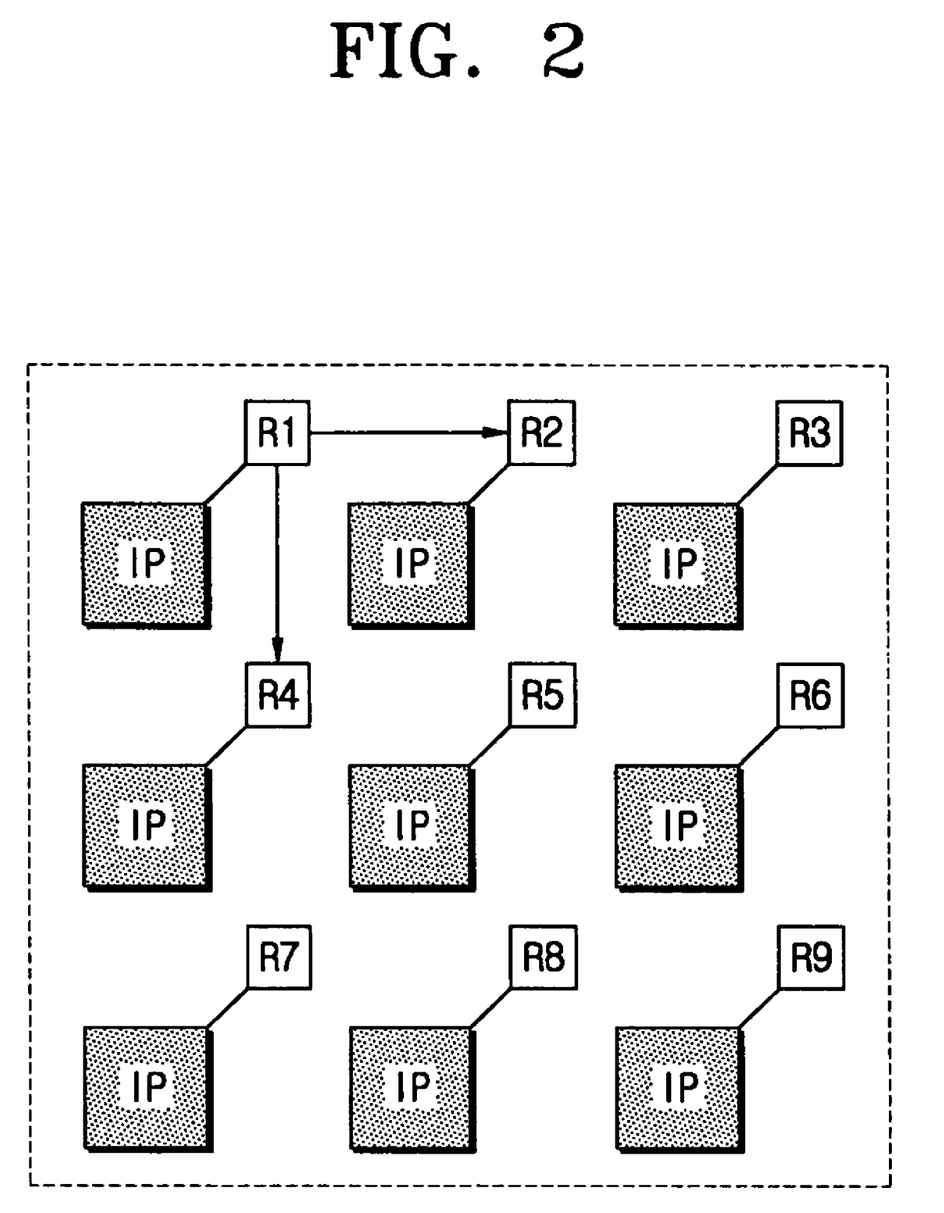
FIG. 2 is a view illustrating operations for establishing an initial path for data transmission according to the embodiment of FIG. 1.

FIG. 2 is a view illustrating operations of a first router for establishing an initial path for data transmission according to an embodiment of the present invention. The IPs embedded in the SoC are assigned a unique address. The IPs constructing the SoC are sequentially assigned a unique address not overlapped one another. Table 1 shows exemplary unique addresses assigned with the IPs.

TABLE 1

| IP numbers | Addresses |
| --- | --- |
| IP1 | 0001 |
| IP2 | 0002 |
| IP3 | 0003 |
| IP4 | 0004 |
| IP5 | 0005 |
| IP6 | 0006 |
| IP7 | 0007 |
| IP8 | 0008 |
| IP9 | 0009 |

As shown in Table 1, the IPs embedded in the SoC are assigned a unique address. The IP1 to IP9 are assigned 0001 to 0009 as addresses, respectively. Table 1 shows the case where the IPs are sequentially assigned an address for the convenience of explanation, but the IPs can be randomly assigned an address not overlapping one another. If an IP is newly embedded in the SoC, the IP is assigned a new address, that is, an address not previously assigned.

The router R1 connected to the IP1 originates routing packets. The router originating the routing packets is assumed to be the router R1 for the convenience of explanation. However, it is to be understood that any other router embedded in the SoC can be the router R1. The router R1 originates routing packets including its own information to establish a path between routers. The originated routing packets are broadcast to neighboring routers. FIG. 2 shows the case when routers 2 and 4 receive the routing packets broadcast by the router 1.

Figure 3:
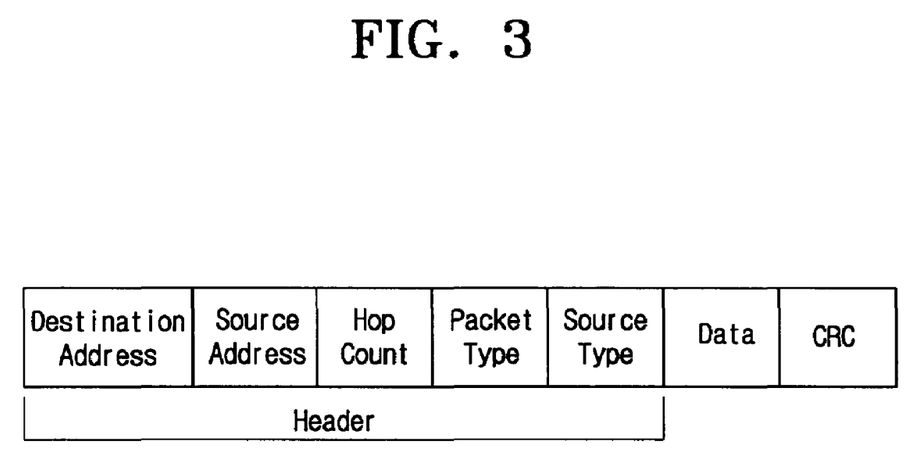
FIG. 3 is a view illustrating routing packet and token packet structures broadcast according to the embodiment of FIG. 1.

FIG. 3 is a view illustrating a routing packet structure. As shown in FIG. 3, the routing packet includes a destination address portion, a source address portion, a hop counter portion, packet type portion, source type portion, data portion, and cyclic redundancy check (CRC) portion.

The destination address portion is a section for an address of an IP to which the routing packets are delivered. However, the routing packets are sent to all IPs embedded in the SoC, so the addresses of all IPs embedded in the SoC become the destination addresses. Thus, an arbitrary address indicating addresses of all IPs is set to the destination address. An address written in the destination address portion cannot be assigned to an IP newly added in the SoC. However, there is a way to enable all IPs to receive the routing packet by leaving a destination address portion of the routing packet empty.

The source address portion is a section for an address of an IP connected to the router delivering the routing packet. That is, the address of the IP1 is the source address. The hop counter portion is a section for the number of hops taken up to the reception of the routing packet. Therefore, the number of hops becomes "1." Other than the above approach, it is possible that the router delivering the routing packet sets the number of hops to "0" and a router having received the routing packet adds "1" to the number of hops.

The packet type portion is a section for describing the type of packets the router sends. If the router sends and receives only routing packets, the packet type is not necessary. However, the router sends and receives various packets in connection with data transmissions, in addition to routing packets. Thus, information indicating the routing packets is written in the packet type portion. Table 2 shows exemplary packet types.

TABLE 2

| Packet types | |
|---|---|
| Normal packet | 00 |
| Routing packet | 01 |
| Token | 10 |
| Halt packet | 11 |

Table 2 shows that the packets the router sends and receives are classified into four types and assigned a unique identifier. The source type portion is a section for the type of an IP connected to the router originating packets. As above, the IPs embedded in the SoC includes computation units, I/O units, and memories. Table 3 as below shows the source types.

TABLE 3

| Source types | |
|---|---|
| Processor | 000 |
| Memory | 001 |
| I/O | 010 |
| Reserved | 100 to 111 |

The data portion is a section for data to be delivered, and the CRC portion is a section for a CRC for checking whether or not data has errors.

The router R1 having delivered the routing packet sends a token packet. The structure of the token packet structure may be the same as that of the routing packet. However, the token packet is assigned "10" as a packet type value as shown in Table 2, and a destination address unlike the routing packet. Description will be made on the token packet below.

Figure 4:
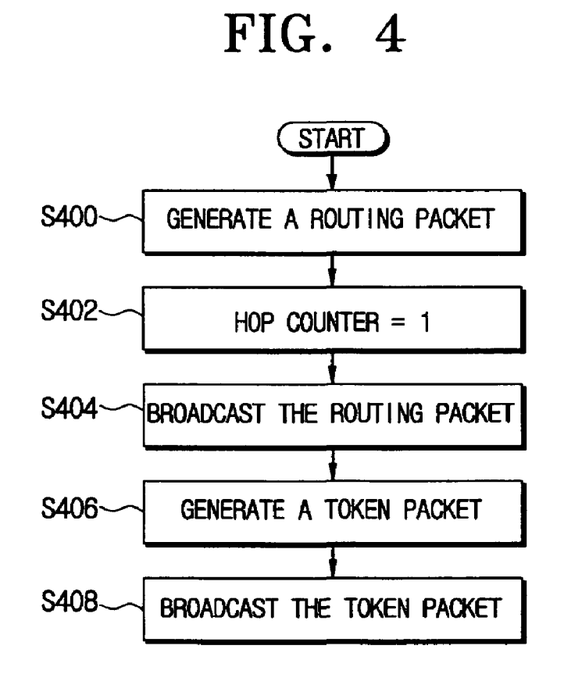
FIG. 4 is a view illustrating operations of a router broadcasting routing packets and token packets according to the disclosed embodiment of the present invention.

FIG. 4 is a view illustrating operations of the router R1 sending a routing packet for the first time. Hereinafter, description will be made in detail on the operations of the router R1 with reference to FIG. 4, according to an embodiment of the present invention.

The router R1 originates a routing packet at operation S400. The same description as above is applied to the structure of the routing packet. The router R1 sets the hop counter to "1" at operation S402. The router R1 broadcasts to neighboring routers the routing packet including the hop counter at operation S404. The router R1 generates a token packet at operation S406. As stated above, the token packet is assigned a destination address. The destination address indicates an address of an IP connected to the router having originated the routing packet. The destination address included in the token packet delivered by the router R1 may be an address of an IP2. The router R1 broadcasts the token packet at operation S408.

Figure 5:
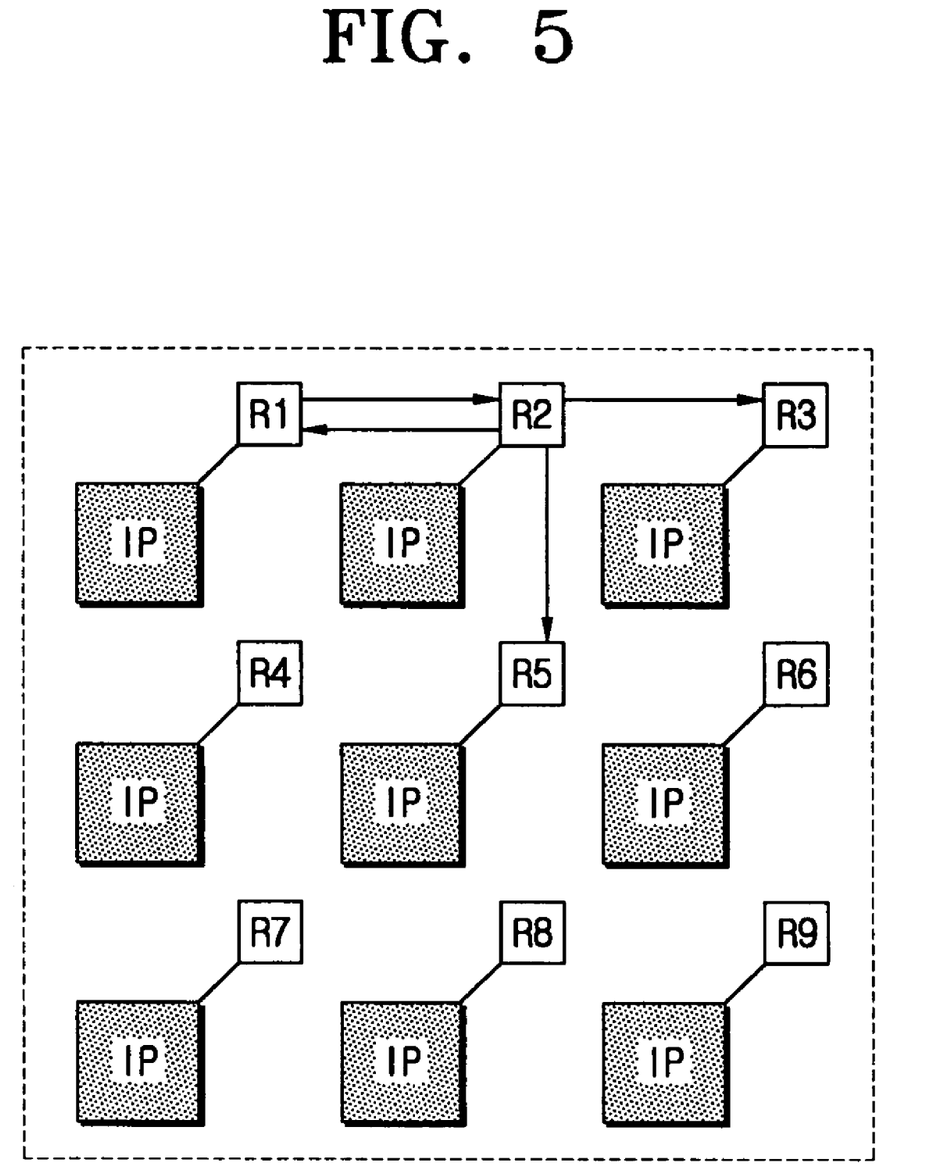
FIG. 5 is a view illustrating a router receiving routing packets and token packets according to the disclosed embodiment of the present invention.
Figure 6:
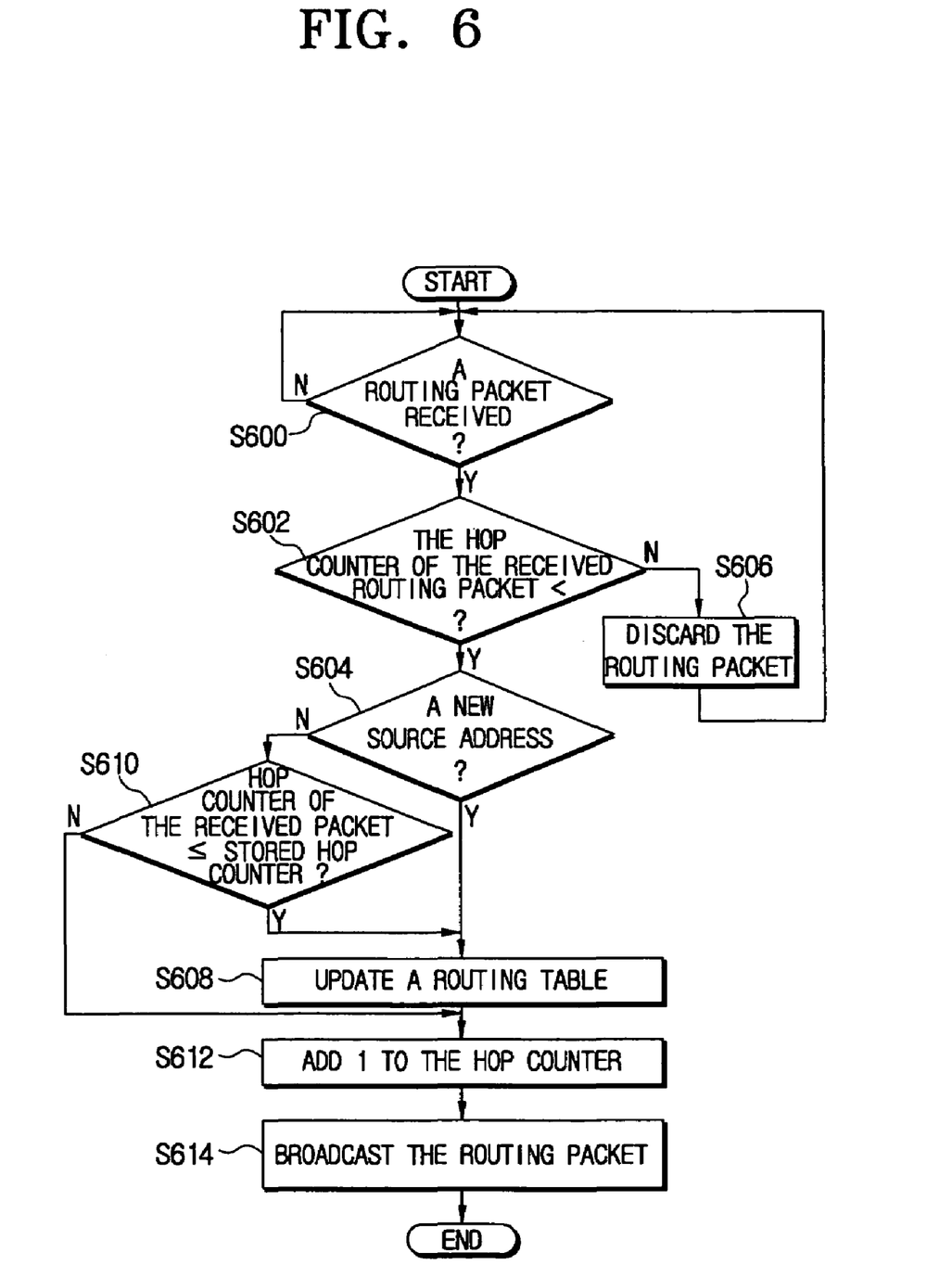
FIG. 6 is a view illustrating operations of a router having received routing packets and token packets according to the disclosed embodiment of the present invention.
Figure 7:
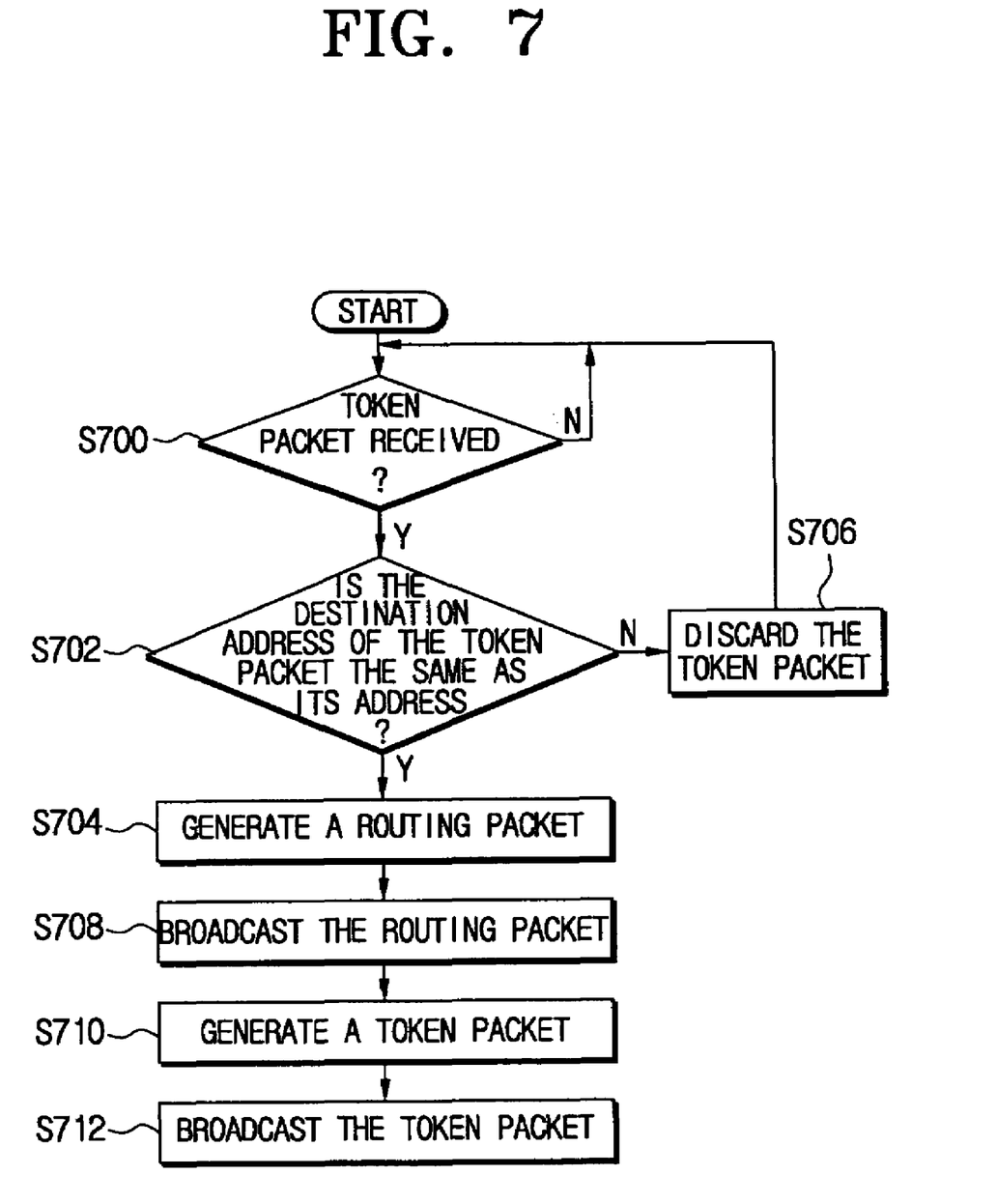
FIG. 7 is a view illustrating operations of a router having received a token packet according to the disclosed embodiment of the present invention.

FIGS. 5 to 7 are views illustrating operations of the router R2 (a neighboring router) having received the routing packet and token packet sent from the router R1 according to an embodiment of the present invention. FIG. 5 is a view illustrating paths for routing packets sent from the router R2, and FIGS. 6 and 7 are views illustrating the operations of the router R2. Hereinafter, description will be made on paths for routing packets sent from the router R2 with reference to FIG. 5.

The router R2 receives the routing packets delivered from the router R1. The router R2 stores the received routing packets. The router R2 updates the received routing packets, and broadcasts the updated routing packets to neighboring routers. That is, the router R2 adds "1" to the number of hops constituting the received routing packets.

The router R2 having sent the routing packets receives a token packet sent by the router R1. The router R2 compares its address to the destination address of the token packet. If its address is not the same as the destination address of the token packet according to the comparison, the router R2 discards the received token packet. If its address is the same as the destination address of the token packet, the router R2 generates a routing packet containing its address as a source address. The token packet the router R1 has sent contains the address of the router R2 as the destination address, so the router R2 generates routing packets.

The router R2 sets its own address to a source address, and generates a routing packet having the hop counter set to "1." The router R2 having generated the routing packet sends it to neighboring routers. That is, the router R2 broadcasts the generated routing packet to the routers R1, R3, and R5.

FIG. 6 is a view illustrating operations of a router (a reception router) having received routing packets according to an embodiment of the present invention. The reception router determines whether a routing packet is received from a neighboring router at operation S600. If the routing packet is received from a neighboring router, the reception router moves to operation S602. If the routing packet is not received from a neighboring router, the reception router moves to (repeats) operation S600. The reception router compares 2(n−1) to the hop counter of the routing packet at operation S602. The 2(n−1) indicates the smallest hop number to a router positioned at n×n from a router positioned at 1×1 and of the n×n mesh topology. If the hop counter of the received routing packet is less than 2(n−1), the reception router moves to the operation S604. If the hop counter of the received routing packet is not less than 2(n−1), the reception router moves to operation S606. The reception router discards the received routing packet at operation S606.

The reception router reads out an address written in the source address portion of the received routing packet at operation S604. The reception router determines whether the read address is a new address. If the read address is a new address, the reception router moves to operation S608, and, if it is not a new address, the reception router moves to operation S610. The reception router updates a routing table by using the received routing packet at operation S608. At operation 610, the reception router compares the hop counter of the received routing packet to the same hop counter for the source address stored in the routing table. If the hop counter of the received routing packet is smaller than or equal to the hop counter stored in the routing table as a result of the comparison, the reception router moves to operation S608, and updates the routing table. If the hop counter of the received routing packet is larger than the hop counter stored in the routing table, the reception router moves to operation S612.

The reception router adds "1" to the hop counter of the received routing packet at operation S612, moves to operation S614, and broadcasts it to neighboring routers. The reception router updates only the hop counter of the received routing packet, and broadcasts it to the neighboring routers. Table 4 shows a routing table stored in the router R5 of FIG. 5. The source address stored in the routing table serves as a destination address in operation for establishing a path for data transmissions.

TABLE 4

| Source addresses | Source types | Hop counters | Previous routers |
|---|---|---|---|
| Router R1 (0001) | 000 | 2 | Router R2 (0002) |
| Router R1 (0001) | 000 | 2 | Router R4 (0004) |
| Router R2 (0002) | 001 | 1 | Router R2 (0002) |
| . | . | . | . |
| . | . | . | . |
| . | . | . | . |
| Router R9 (0009) | 010 | 2 | Router R6 (0006) |
| Router R9 (0009) | 010 | 2 | Router R8 (0008) |

In Table 4, the router R5 (of FIG. 5) updates the routing table by using routing packets that the routers R1 to R4 (of FIG. 5) and routers R6 to R9 (of FIG. 5) generate and deliver. The router R5 receives from the routers R2 to R4 the routing packet generated by the router R1. It can be seen that the hop counters received by the router R5 from the routers R2 and R4 have the same number of 2. The router R5 establishes a path for data transmissions by using the routing table. That is, if data is to be delivered to the router R1, the router R5 delivers the data to the router R1 through the router R2. If data is to be sent to the router R1, the router R5 sends the data to the router R1 through the router R4.

FIG. 7 is a view illustrating the operations of a router having received a token packet according to an embodiment of the present invention. Hereinafter, description will be made on the operations of a router having received a token packet with reference to FIG. 7 according to an embodiment of the present invention.

The router determines whether a token packet is received at operation S700. If the token packet is received, the router moves to the operation S702, and, if the token packet is not received, the router moves to (repeats) operation S700. The router reads out a destination address of the received token packet at operation S702. The router compares the read destination address to its address. If the read address is the same as its address, the router moves to operation S704, and, if the address is not the same as its own address, the router moves to operation S706. The router discards the received token packet at operation S706.

The router generates a routing packet including its information at operation S704. The same description as in FIG. 5 is applied to an approach for generating the routing packet. The router broadcasts the generated routing packet to neighboring routers at operation S708. The router having generated and broadcast the routing packet has to designate a router to generate a next routing packet. As stated above, the routers to generate the routing packet are designated in the order of addresses. Accordingly, if a router having delivered the routing packet is "0002," the router having the address of "0003" is designated. The router generates a token packet having as a destination address the address of a router to generate a next routing packet at operation S710. The router broadcasts the generated token packet to neighboring routers at operation S712.

As stated above, the router broadcasts the generated routing packet, updates and broadcasts the received routing packet, receives a token packet from a neighboring router, and broadcasts the generated token packet to neighboring routers. By performing the operations as in FIGS. 5 to 7, the routers in the SoC store the routing table such as Table 4, and obtain information on the routers in the SoC by using the routing table.

Since the routers in the SoC are fixed in a chip in general, the routing table once stored is not updated. Hereinafter, description will be made on a process for a router in the SoC to establish a path for data transmissions with reference to FIG. 8. The routers can obtain their position information (x, y) by using addresses, which will be explained based on the router R1 with reference to FIG. 1. If the position information of the router R1 (of FIG. 5) is (0, 0), the position information of the router R2 (of FIG. 5) becomes (1, 0). The position information of the router R5 (of FIG. 5) becomes (1, −1), and the position information of the router R9 becomes (2, −2). The routers in the SoC are aware of the addresses of the individual routers and the position information corresponding to the addresses.

Figure 8:
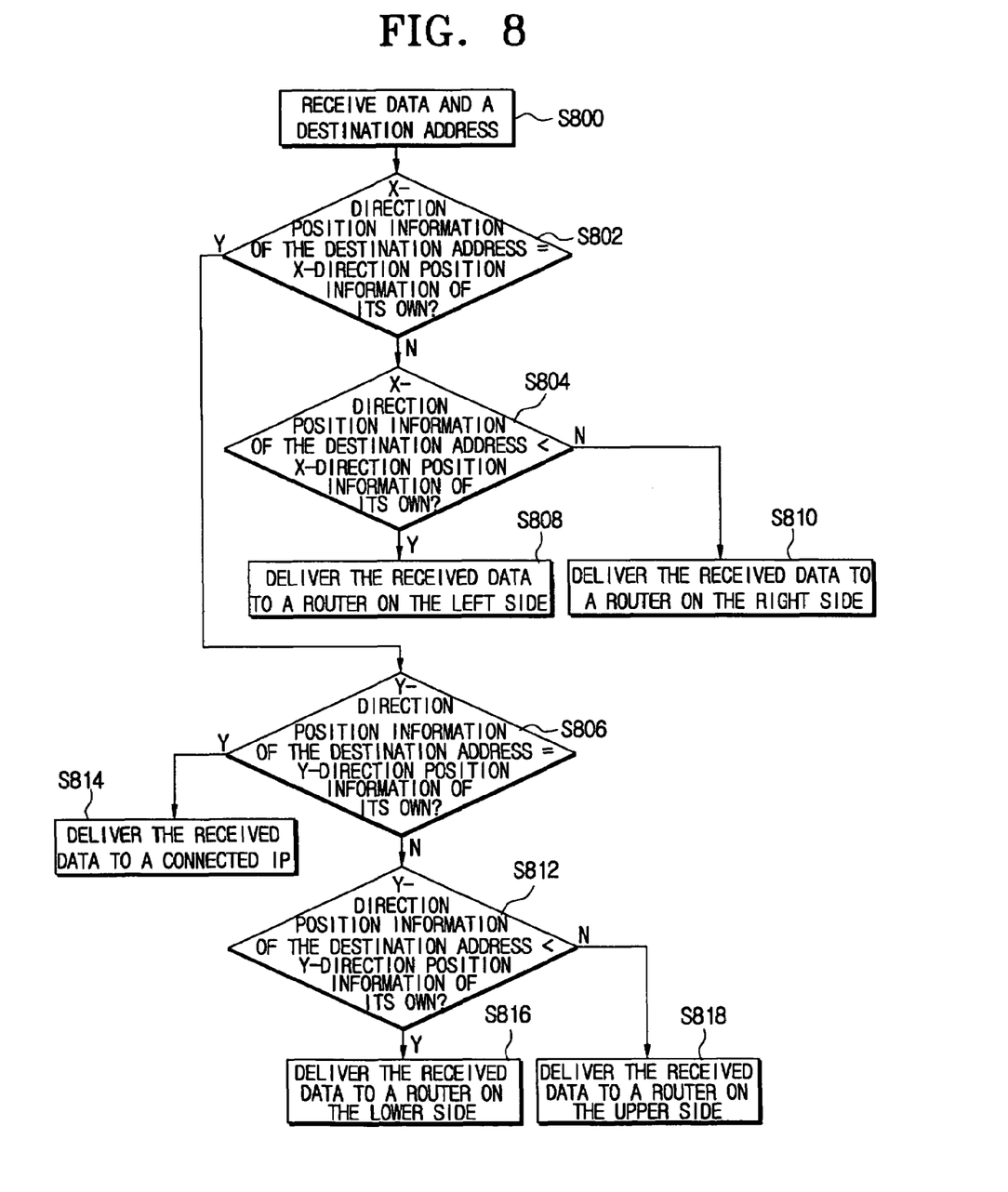
FIG. 8 is a view illustrating a process for establishing a path to a neighboring router according to the disclosed embodiment of the present invention.

The router receives data and a destination address of the data from a neighboring router at operation S800. The router compares the x-direction position information of the received destination address to its x-direction position information at operation S802. If the x-direction position information is not the same, the router moves to the operation S804, and, if the x-direction position information is the same, the router moves to the operation S806.

In the operation S804, if the x-direction position information of the destination address is less than its x-direction information, the router moves to the operation S808, and sends the received data a router on its left side. In the operation S804, if the x-direction position information of the destination address is greater than its own x-direction information, the router moves to operation S810, and sends the received data to a router on its right side.

The router compares the y-direction position information of the received destination address to its own y-direction position information at operation S806. If the y-direction position information is not the same, the router moves to operation S812, and, if the y-direction position information is the same, the router moves to operation S814. The router becomes aware that it is the destination of the received data at operation S814. Thus, the router delivers the received data to an IP connected thereto.

If the y-direction position information of the destination address is less than its own y-direction position information, the router moves to the operation S816, and delivers the received data to a router at its lower side at operation S812. If the y-direction position information of the destination address is greater than its own y-direction position information, the router moves to the operation S818, and delivers the received data to a router at its upper side at operation S812.

In FIG. 8, the router compares the x-direction position information, and, if equal, compares the y-direction position information. However, if the compared y-direction position information is the same, the router can compare the x-direction position information. The router can alternately compare the x-direction position information and the y-direction position information.

The router can establish two paths for data transmissions. With reference to FIG. 1, the router R5 can establish two paths with respect to the router R1. That is, there are an approach passing through the router R2 and an approach passing through the router R4. The approach passing through the router R2 is an approach comparing the y-direction position information for the first time, and the approach passing through the router R4 is an approach comparing the x-direction position information for the first time. Even though the router R5 is set to compare the y-direction position information for the first time, the router R5 can compare the x-direction position information for the first time if the y-direction path has been occupied. That is, if the path between the router R5 and the router R2 has been occupied, the router R5 can establish a path for data transmissions by using the router R4. By doing so, the routers can be efficiently used.

The described embodiment of the present invention can establish a path by using the stored routing table. Furthermore, the above-described embodiment of the present invention can secure the expandability of a network by updating the routing table, and efficiently deliver data by searching for an available path if a specific path has been occupied.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A method of establishing a path between routers in a system-on-chip (SoC) of n×n mesh topology structure having a plurality of intellectual properties (IPs) each with a unique address and routers corresponding to each of the IPs respectively, wherein n is a positive integer, the method comprising:
   receiving a routing packet including a hop counter, at a router;
   reading the routing packet to determine whether an address of an IP corresponding to a router that generated the routing packet is a new address;
   if the address is a new address, updating address information and information in a routing table stored by the router that received the routing packet;
   establishing a path to at least one neighboring router using the updated routing table upon a request to establish the path; and
   delivering data by using the established paths,
   wherein the established path is established by comparing position information corresponding to address information of an IP corresponding to the neighboring router having received data to position information corresponding to address information of an IP to deliver the data.

2. The method as claimed in claim 1, further comprising broadcasting the generated routing packet from the router, which generated the routing packet, to at least the router, which received the routing packet.

3. The method as claimed in claim 2, wherein:
   the address information is address information of an IP corresponding to the router that generated the routing packet; and
   after the generated routing packet is broadcast, the router, which generated the routing packet, generates and sends a token packet to the at least one neighboring router.

4. The method as claimed in claim 3, wherein the token packet includes an address of an IP corresponding to a destination router to instruct the destination router to generate the routing packet.

5. The method as claimed in claim 4, wherein, when an address contained in the token packet is the same as that of an IP corresponding to the destination router, the destination router that received the token packet generates and sends a routing packet containing address information of the IP.

6. The method as claimed in claim 1, wherein, when the hop counter of the received routing packet is greater than 2(n−1), the received routing packet is discarded.

7. The method as claimed in claim 6, wherein, when the same address information as that contained in the received routing packet is stored in the routing table, the hop counter of the received routing packet and the hop counter stored in the routing table are compared to determine whether to update the routing table.

8. The method as claimed in claim 7, wherein the hop counter contained in the received routing packet is increased by 1 and delivered to the at least one neighboring router.

9. The method as claimed in claim 1, wherein the position information contains x and y components, x indicating position information on a horizontal axis corresponding to the address information, and y indicating position information on a vertical axis corresponding to the address information.

10. The method as claimed in claim 9, wherein, when an intended path to the neighboring router is occupied, another path is established to another neighboring router having the same hop counter as that of the neighboring router.

11. The method as claimed in claim 1, wherein the router that generated the routing packet sets the hop counter of the routing packet to 1, broadcasts the routing packet to at least one neighboring router, generates a token packet having a destination address indicating an address of an IP connected to the router which generated the routing packet, and broadcasts the token packet to the at least one neighboring router.

12. The method as claimed in claim 1, wherein the operation of establishing a path comprises:
   receiving data and a destination address of the data from a neighboring router;
   determining whether x-direction position information of the received destination address is the same as x-direction position information of a receiving router;
   sending the received data to a router based on the determining of x-direction information;
   if the x-direction position information of the received destination address is determined to be the same, determining whether the y-direction position information of the received destination address is the same as y-direction position information of the receiving router; and
   sending the received data to a router based on the determining of y-direction information.

13. The method of claim 12, wherein the sending the received data to a router based on the determining of x-direction information includes:
   sending the received data to a router on a left side when the x-direction position information is determined not to be the same and the x-direction position information of the destination address is determined to be less than the x-direction information of the receiving router; and
   sending the received data to a router on a right side when the x-direction position information is determined not to be the same and the x-direction position information of the destination address is greater than the x-direction information of the receiving router.

14. The method of claim 12, wherein the sending the received data to a router based on the determining of y-direction information includes:
   sending the received data to a router at a lower side when the y-direction position information is determined not to be the same and the y-direction position information of the destination address is determined to be less than the y-direction position information of the receiving router; and
   sending the received data to a router on an upper side when the y-direction position information is determined not to be the same and the y-direction position information of the destination address is determined to be greater than the y-direction position information of the receiving router.

15. The method of claim 12, further comprising sending the received data to an IP connected thereto when the x-direction position information and the y-direction position information is determined to be the same.

16. A system-on-chip (SoC) having a n×n mesh topology structure having a plurality of intellectual properties (IPs) each with a unique address and routers corresponding respectively to the plurality of IPs, and for establishing a path between routers, wherein n is a positive integer, the system-on-chip comprising:
the routers receiving routing packets each including a hop counter and address information of an IP corresponding to a router that generated the routing packet, reading the routing packet to determine whether the address of the IP corresponding to the router that generated the routing packet is a new address, if the address is a new address, updating information constituting a stored routing table by use of the received routing packets, and establishing a path to one of neighboring routers by use of the updated routing table upon requested to establish the path; and
the IPs receiving and delivering data by using the established path,
wherein the router establishes the oath by comparing position information corresponding to address information of an IP connected to a router having received data to position information corresponding to address information of an IP to deliver the data.

17. The system-on-chip as claimed in claim 16, wherein the address information is address information of an IP corresponding to a router which generated the routing packet.

18. The system-on-chip as claimed in claim 17, wherein the router, which generated the routing packet, sends the generated routing packet, and generates and sends a token packet to the at least one neighboring router.

19. The system-on-chip as claimed in claim 18, wherein the token packet includes an address of an IP corresponding to a destination router to instruct the destination router to generate the routing packet.

20. The system-on-chip as claimed in claim 19, wherein, when an address contained in the token packet is the same as that of an IP corresponding to the destination router, the destination router generates and sends a routing packet containing address information of the IP.

21. The system-on-chip as claimed in claim 16, wherein, if a hop counter of the received routing packet is equal to or larger than 2(n−1), the router, which receives the routing packet, discards the received routing packet.

22. The system-on-chip as claimed in claim 21, wherein, if the same address information as that contained in the received routing packet is stored in the routing table, the router, which has received the routing packet, compares the hop counter of the received routing packet and the hop count stored in the routing table to determine whether to update the routing table.

23. The system-on-chip as claimed in claim 22, wherein the router adds 1 to the hop counter contained in the received routing packet, and delivers the same to the neighboring routers.

24. The system-on-chip as claimed in claim 16, wherein the position information contains x and y components, x indicating position information on a horizontal axis corresponding to the address information, and y indicating position information on a vertical axis corresponding to the address information.

25. The system-on-chip as claimed in claim 24, wherein, if an intended path to the neighboring router is occupied, the router establishes another path to another neighboring router having the same hop counter as that of the neighboring router.

26. A method of establishing a path between routers in a system-on-chip of n×n mesh topology structure, wherein n is a positive integer, the method comprising: comparing, when a routing packet is received from a neighboring router, a hop counter of the routing packet to 2(n−1), reading a source address from the received routing packet when the hop counter of the received routing packet is determined to be less than 2(n−1), and discarding the received routing packet when the hop counter of the received routing packet is determined not to be less than 2(n−1), 2(n−1) being a smallest hop number to a router positioned at n×n from a router positioned at 1×1 and of the n×n mesh topology;
determining whether the read address is a new address, updating a routing table using the received routing packet when the read address is a new address, and comparing the hop counter of the received routing packet to a stored hop counter for the source address stored in the routing table when the read address is not a new address;
updating the routing table when the hop counter of the received routing packet is determined in the comparing the hop counter of the received routing packet to the stored hop counter to be less than or equal to the hop counter stored in the routing table;
updating the hop counter of the received routing packet when the hop counter of the received routing packet is determined in the comparing the hop counter of the received routing packet to the stored hop counter to be larger than the hop counter stored in the routing table; and
determining whether a destination address of a received token packet is the same as that of the router, sending the routing packet data to an IP connected thereto when the destination address is determined to be the same, and broadcasting the updated received router packet to at least another neighboring router when the destination address is determined not to be the same.

27. The method of claim 26, wherein the IPs are assigned a unique address.

28. The method of claim 26, wherein the addresses are randomly assigned.

29. A method of establishing a path between routers in a system-on-chip of n×n mesh topology structure, wherein n is a positive integer, the method comprising:
reading a destination address of a received token packet received by a receiving router from a neighboring router;
comparing the read destination address to the address of the receiving router;
generating a routing packet including information about the receiving router when the addresses are determined to be the same, and discarding the received token packet when the addresses are determined not to be the same;
broadcasting the generated routing packet to at least one neighboring router;
designating a router to generate a next routing packet;
generating a token packet having a destination address of the designated router; and
broadcasting the generated token packet to the at least one neighboring router.

* * * * *

UNITED STATES PATENT AND TRADEMARK OFFICE
CERTIFICATE OF CORRECTION

| | |
|---|---|
| PATENT NO. | : 7,522,538 B2 |
| APPLICATION NO. | : 10/998957 |
| DATED | : April 21, 2009 |
| INVENTOR(S) | : Sang-woo Rhim et al. |

It is certified that error appears in the above-identified patent and that said Letters Patent is hereby corrected as shown below:

Column 9, Line 34, change "counter," to --counter--.

Column 9, Line 45, change "paths," to --path,--.

Column 11, Line 28, change "oath" to --path--.

Signed and Sealed this

Twenty-first Day of July, 2009

JOHN DOLL
*Acting Director of the United States Patent and Trademark Office*